United States Patent
Awiszus et al.

(10) Patent No.: US 9,641,926 B2
(45) Date of Patent: May 2, 2017

(54) MODULAR COMMUNICATION DEVICE AND SYSTEM

(71) Applicant: 3M INNOVATIVE PROPERTIES COMPANY, St. Paul, MN (US)

(72) Inventors: Steven T. Awiszus, Woodbury, MN (US); Robert N. Berger, Hugo, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 353 days.

(21) Appl. No.: 13/910,448

(22) Filed: Jun. 5, 2013

(65) Prior Publication Data
US 2013/0329905 A1 Dec. 12, 2013

Related U.S. Application Data

(60) Provisional application No. 61/657,456, filed on Jun. 8, 2012.

(51) Int. Cl.
*H04R 1/10* (2006.01)
*H04R 25/00* (2006.01)
(Continued)

(52) U.S. Cl.
CPC ............ *H04R 1/1091* (2013.01); *H04M 1/00* (2013.01); *H04M 1/6066* (2013.01);
(Continued)

(58) Field of Classification Search
CPC ...... H04R 1/1091; H04R 1/1058; H04R 5/02; H04R 1/1041; H04R 1/1025; H04R 5/033;
(Continued)

(56) References Cited

U.S. PATENT DOCUMENTS 6,236,969 B1 * 5/2001 Ruppert ................. H04M 1/05
704/270
6,406,811 B1 6/2002 Hall
(Continued)

FOREIGN PATENT DOCUMENTS

CN 104350683 A 2/2015
WO WO-0007176 A1 2/2000
(Continued)

OTHER PUBLICATIONS

"Chinese Application Serial No. 201380030097.4, Office Action mailed Jan. 12, 2016", W/ English Translation, 7 pgs.
(Continued)

*Primary Examiner* — Xu Mei
*Assistant Examiner* — Ubachukwu Odunukwe
(74) *Attorney, Agent, or Firm* — Emily M. Van Vliet (57) ABSTRACT

The technology disclosed herein relates to a modular communication device and a system. The modular communication device has a speaker carrier and an electronics module. The speaker carrier has a speaker and an attachment portion, and the electronics module has a wireless transceiver. The speaker carrier and the electronics module are detachably coupled so that the electronics module provides audio signals to the speaker when the speaker carrier and electronics module are coupled. The speaker carrier can be removed from and attached to the electronic module. In one embodiment, the system generally has two or more modular communication devices and a base station that allows communication between the modular communication devices.

18 Claims, 5 Drawing Sheets

(51) Int. Cl.
*H04M 1/00* (2006.01)
*H04M 1/60* (2006.01)

(52) U.S. Cl.
CPC ......... *H04R 1/1041* (2013.01); *H04R 1/1058* (2013.01); *H04R 25/00* (2013.01); *H04R 2420/07* (2013.01); *H04R 2420/09* (2013.01); *H04R 2430/01* (2013.01)

(58) Field of Classification Search
CPC ........ H04R 1/10; H04R 25/00; H04R 1/1083; H04R 2420/07; G06F 13/00; H04M 1/0254; H04M 1/05; H04M 1/00; H04M 3/42; H04M 3/568; H04M 1/6066; H04M 1/02
USPC ........ 381/74, 374, 103, 311, 384, 122, 71.1, 381/111; 455/416, 3.05, 41.3, 566, 566.1, 455/39, 575.2, 403, 569.1; 310/25; 704/275; 429/96; 710/304; 361/600
See application file for complete search history.

(56) References Cited

U.S. PATENT DOCUMENTS

| | | | |
|---|---|---|---|
| 6,978,163 B2 | 12/2005 | Dyer et al. | |
| 7,181,300 B2 * | 2/2007 | Robbins | G06Q 20/20 348/E7.063 |
| 7,254,368 B1 | 8/2007 | Okada | |
| 7,519,196 B2 | 4/2009 | Bech | |
| 7,599,679 B2 | 10/2009 | Awiszus | |
| 7,899,445 B2 | 3/2011 | Guccione | |
| 8,005,455 B2 | 8/2011 | Awiszus | |
| 8,128,422 B2 | 3/2012 | Mellott | |
| 8,204,435 B2 | 6/2012 | Seshadri | |
| 8,520,860 B2 | 8/2013 | Wulff | |
| 8,694,040 B2 | 4/2014 | Awiszus | |
| 9,020,553 B2 | 4/2015 | Awiszus | |
| 9,154,599 B2 | 10/2015 | Awiszus | |
| 2004/0198220 A1 * | 10/2004 | Whelan | H04W 12/06 455/41.1 |
| 2004/0208335 A1 | 10/2004 | Gleissner | |
| 2005/0113136 A1 | 5/2005 | Gosieski, Jr. | |
| 2005/0202857 A1 | 9/2005 | Seshadri et al. | |
| 2007/0042762 A1 * | 2/2007 | Guccione | H04M 3/568 455/416 |
| 2007/0053544 A1 | 3/2007 | Jhao et al. | |
| 2007/0190966 A1 | 8/2007 | Awiszus | |
| 2007/0223719 A1 * | 9/2007 | Huang | H04R 1/1041 381/74 |
| 2008/0198623 A1 | 8/2008 | Hine | |
| 2009/0015719 A1 | 1/2009 | Banner et al. | |
| 2009/0046884 A1 | 2/2009 | Schapiro | |
| 2009/0154719 A1 * | 6/2009 | Wulff | H04M 1/0254 381/74 |
| 2009/0154740 A1 * | 6/2009 | Regen | H04R 1/1041 381/311 |
| 2009/0318076 A1 * | 12/2009 | Awiszus | H04M 1/72502 455/3.05 |
| 2009/0323975 A1 | 12/2009 | Groesch | |
| 2010/0096936 A1 * | 4/2010 | Bae | H02K 33/16 310/25 |
| 2010/0292050 A1 * | 11/2010 | Dibenedetto | A63B 24/0062 482/9 |
| 2011/0306379 A1 | 12/2011 | Awiszus | |
| 2012/0039481 A1 | 2/2012 | McClain | |
| 2012/0060920 A1 | 3/2012 | Fornari | |
| 2014/0170984 A1 | 6/2014 | Awiszus | |
| 2015/0215442 A1 | 7/2015 | Awiszus | |

FOREIGN PATENT DOCUMENTS

| | | |
|---|---|---|
| WO | WO-2007094981 A1 | 8/2007 |
| WO | WO-2013184776 A1 | 12/2013 |

OTHER PUBLICATIONS

"Chinese Application Serial No. 201380030097.4, Office Action mailed Aug. 6, 2015", W/ English Translation, 15 pgs.
"European Application Serial No. 13800230.8, Extended European Search Report mailed Feb. 10, 2016", 8 pgs.
"Handbook of Intercom Systems Engineering, First Edition", Telex, (Mar. 2002), 169 pgs.
"HME Introduces ION IQ Digital Drive-Thru System With All-New, Comprehensive Sound Management", HM Electronics, Inc., (Feb. 12, 2010), 1 pg.
"International Application Serial No. PCT/US2013/044280, International Preliminary Report on Patentability mailed Dec. 9, 2014", 11 pgs.
"International Application Serial No. PCT/US2013/044280, International Search Report mailed Oct. 18, 2013", 3 pgs.
"International Application Serial No. PCT/US2013/044280, Written Opinion mailed Oct. 18, 2013", 10 pgs.
"PRO850 Wireless Intercom Operating Instructions", HM Electronics, Inc, (Sep. 11, 2003), 45 pgs.
"Radio Com BTR-800 TR-800", Telex Operating Instructions, (Jun. 2002), 74 pgs.
"U.S. Case No. IPR2015-00482", Case File: Paper Nos. 0-35, 554 pgs.
"U.S. Case No. IPR2015-00482", Case File: Exhibit/s 1003A, 902 pgs.
"U.S. Case No. IPR2015-00482", Case File: Exhibit/s 1003B, 571 pgs.
"U.S. Case No. IPR2015-00482", Case File: Exhibit/s 1004A, 424 pgs.
"U.S. Case No. IPR2015-00482", Case File: Exhibit/s 1001-1002, 402 pgs.
"U.S. Case No. IPR2015-00482", Case File: Exhibit/s 1004B, 480 pgs.
"U.S. Case No. IPR2015-00482", Case File: Exhibit/s 1005-1017, 588 pgs.
"U.S. Case No. IPR2015-00482", Case File: Exhibit/s 2006-2009, 124 pgs.
"U.S. Case No. IPR2015-00482", Case File: Exhibit/s 2001-2004, 220 pgs.
"U.S. Case No. IPR2015-00491", Case File: Paper Nos. 0-35, 502 pgs.
"U.S. Case No. IPR2015-00491", Case File: Exhibit/s 1003A, 902 pgs.
"U.S. Case No. IPR2015-00491", Case File: Exhibit/s 1004A, 424 pgs.
"U.S. Case No. IPR2015-00491", Case File: Exhibit/s 1004B, 480 pgs.
"U.S. Case No. IPR2015-00491", Case File: Exhibit/s 1003B, 571 pgs.
"U.S. Case No. IPR2015-00491", Case File: Exhibit/s 1001-1002, 402 pgs.
"U.S. Case No. IPR2015-00491", Case File: Exhibit/s 1005-1017, 588 pgs.
"U.S. Case No. IPR2015-00491", Case File: Exhibit/s 2001-2004, 171 pgs.
"U.S. Case No. IPR2015-00491", Case File: Exhibit/s 2006-2008, 144 pgs.
"U.S. Appl. No. 95/002,238", File History: Jan. 28, 2015-May 19, 2016.
"U.S. Appl. No. 95/002,238", File History: Sep. 13, 2012-Aug. 22, 2014.
"U.S. Appl. No. 95/002,239", File History: Jan. 25, 2012-Oct. 21, 2013.
"U.S. Appl. No. 95/002,239", File History: Jan. 26, 2015-Dec. 18, 2015.
"U.S. Appl. No. 95/002,239", File History: Apr. 8, 2014-Sep. 22, 2014.
"U.S. Appl. No. 95/002,239", File History: Sep. 13, 2012-Dec. 20, 2012.
"U.S. Appl. No. 95/002,239", File History: Sep. 22, 2014 Part 1.
"U.S. Appl. No. 95/002,239", File History: Sep. 22, 2014 Part 2.

(56) References Cited

OTHER PUBLICATIONS

"Wireless 6000: Wireless Drive-Thru Audio System Installation Instructions", HM Electronics, Inc., (Aug. 29, 2003), 50 pgs.
"Wireless Intercom System Service Information", 3M, Food Services Trade Department, (Mar. 2003), 18 pgs.

* cited by examiner

MODULAR COMMUNICATION DEVICE AND SYSTEM

FIELD OF THE INVENTION

Generally, the technology disclosed herein relates to a communication system. More particularly, the technology disclosed herein relates to a communication system having a modular communication device.

BACKGROUND

Intercom headsets used in quick service restaurant establishments suffer from high use in a relatively hostile environment. There is little to no maintenance for these products provided at the restaurants and they are expected to survive anywhere from five to ten years. One reliability issue suffered from the existing products is mechanical breakage. Most repairs to these products are mechanical in nature, particularly regarding the headband and microphone boom. The current repair solution is to send the headset to a repair facility where it is repaired and then returned to the customer. This process can take one week or longer and can be costly to the customer both in repair cost and lost use time. It is estimated that any given headset will need to be repaired two times during its useful life, once during the warranty period, and once outside of the warranty period. The repairs can be costly to the manufacturer during the warranty period and to the customer outside of the warranty period.

SUMMARY OF THE INVENTION

The technology described herein generally relates to a communication system that two or more modular communication devices. Each modular communication device has a speaker carrier having a speaker and an attachment portion, where the attachment portion is configured to attach to a user. Each modular communication device has an electronics module with a housing and a wireless transceiver disposed in the housing. The speaker carrier and the housing of the electronics module are detachably coupled such that the wireless transceiver of the electronics module and the speaker of the speaker carrier are detachably coupled. A base station has a wireless transceiver that enables communication between the two or more modular communication devices.

The technology disclosed herein also relates to a modular communication device having a speaker carrier, an electronics module, and a user input device for changing a channel of a wireless transceiver. The speaker carrier has a speaker and an attachment portion, and the electronics module has a wireless transceiver. The speaker carrier and the electronics module are detachably coupled so that the electronics module provides audio signals to the speaker when the speaker carrier and electronics module are coupled. The speaker carrier can be removed from and attached to the electronic module.

The technology disclosed herein also relates to an electronics module having a housing with one or more mating electrical contacts on a mating surface, where the mating surface is configured to receive a speaker carrier. A controller is disposed in the housing, wherein the controller is in communication with the one or more mating electrical contacts. An authentication protocol in communication with the controller, and is configured to authenticate the speaker carrier.

The invention may be more completely understood and appreciated in consideration of the following detailed description of various embodiments of the invention in connection with the accompanying drawings.

DETAILED DESCRIPTION

The technology generally relates to modular communication devices in a communication system. The modular communication device generally has a speaker carrier and an electronics module. The electronics module couples to the speaker carrier to achieve device functionality. The speaker carrier has a speaker and an attachment portion, where the attachment portion can attach to a device user or a structure in proximately to the device user. The electronics module houses at least a wireless transceiver. The electronics module and the speaker carrier detachably couple, which detachably puts the speaker and the wireless transceiver into communication with each other so that the speaker will play audio information received by the wireless transceiver. In one embodiment, the speaker carrier also includes a microphone.

When a communication device such a headset is used in a relatively fast-paced quick service restaurant environment, it may be subjected to rough handling and lack any maintenance on site. One reliability issue frequently suffered by existing headset devices in restaurants is mechanical breakage of the headband, speaker, microphone boom or more than one of these. The use of a modular communication device allows for easy replacement of the more vulnerable speaker carrier, which may include a headband and a microphone boom. A damaged speaker carrier can be easily detached from the electronics module containing the wireless transceiver. A replacement speaker carrier can then be attached to the electronics module, resulting in a fully functional unit without the time and expense of sending a communication device off-site for disassembly and repair.

The electronics module, which contains the more expensive and complex electronics components, such as the transceiver, can include a robust housing. The speaker carrier, which can be easily replaced, can be provided at a lower cost to reduce the overall cost of the product. The modular communication device also enables changes between different configurations of the device, such from a headset with one speaker and a microphone, a headset with two speakers and a microphone, a headset with one speaker and no microphone, and a headset with two speakers and no microphone. The speaker carrier provides the speaker or speakers, a microphone if appropriate and an attachment device, so that different configurations of speaker carriers can be attached to an electronics module.

In one embodiment, an authentication protocol can be used between the electronics module and the speaker carrier. In one embodiment, two or more modular communication devices can be incorporated in a system with a base station to enable audio communication between the modular communication devices. Many additional embodiment options are discussed, and it should be understood that each feature and component described can be combinable each of the different embodiments.

Some examples of the modular communication device have been described as being used in quick service restaurants. But the modular communication device described herein is contemplated for use in many different environments where communication is needed, such as the sidelines of sporting events, warehouses, museums, tour groups and vocational training.

Figure 1:
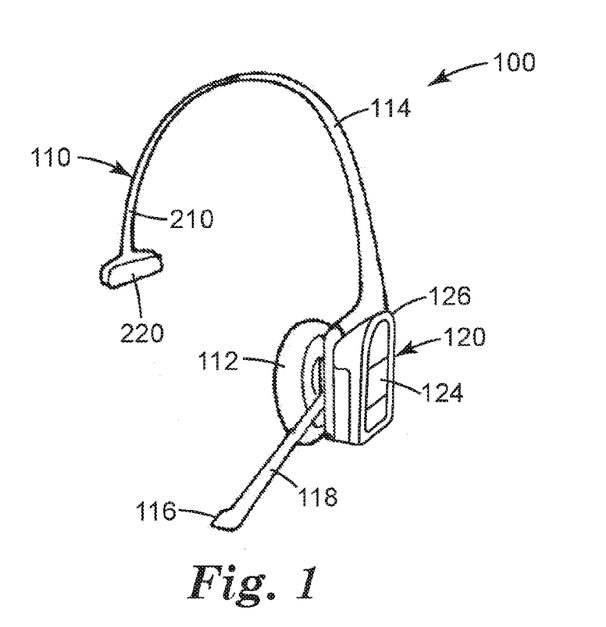
FIG. 1 depicts a modular communication device, consistent with the technology disclosed herein.
Figure 2:
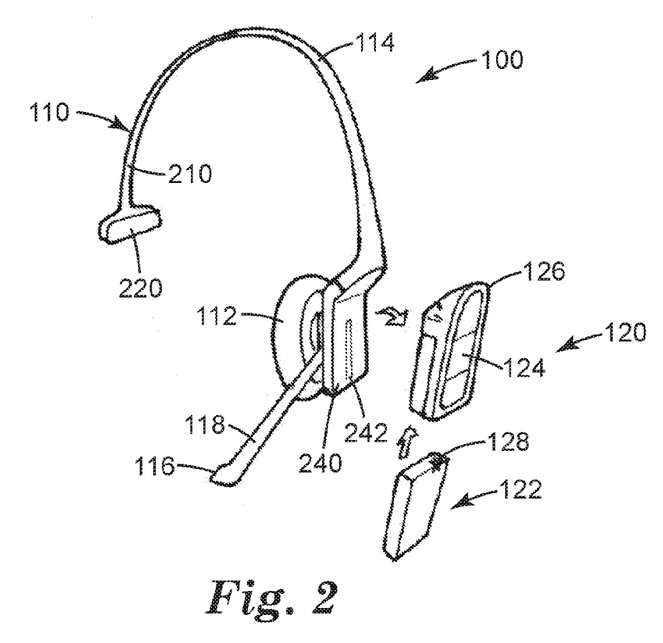
FIG. 2 depicts a partially exploded view of the modular communication device of FIG. 1.

FIG. 1 depicts an assembled view of an example modular communication device, and FIG. 2 depicts a partially exploded view of the example modular communication device of FIG. 1. Generally, the communication device 100 has a speaker carrier 110 and an electronics module 120. The speaker carrier 110 and the electronics module 120 are coupled to achieve functionality of the communication device 100. It is contemplated that the speaker carrier 110 couples to a plurality of electronics modules having varying configurations to achieve variances in functionality. Likewise, the electronics module 120 couples to a variety of speaker carriers 110 to achieved variances in functionality. Furthermore, it is envisioned that, if the need or desire arises, either the speaker carrier 110 or the electronics module 120 can be replaced without replacing the other of the speaker carrier 110 or the electronics module 120.

The speaker carrier 110 has a speaker 112 and an attachment portion 114, where the attachment portion 114 is generally configured to attach to a structure. The structure can be a device user or a particular location, as examples, although in the current embodiment, the attachment portion 114 is configured to be received by the head of the device user. As such, in the current embodiment the attachment portion 114 defines a partial inner annular surface 210 that is configured rest over a user's head, and an ear rest 220 configured to rest above a user's ear.

In some embodiments the attachment portion of the speaker carrier is configured to attach to a user's belt, or otherwise be attached to the user's waist or hip area. In yet another embodiment the speaker carrier is configured to attach to a user's neck. In yet another embodiment the speaker carrier is configured to attach to a user's wrist. In another embodiment the speaker carrier is a lanyard. In embodiments where the speaker carrier is configured to attach to a particular location, the particular location could be a counter, wall, desk, chair, and so on. In such embodiments a mounting component can be coupled to the desired attachment location of the speaker carrier, and the speaker carrier is selectively mounted to, and dismounted from, the mounting component. Those having skill in the art will appreciate that the attachment portion of the speaker carrier can be configured to attach to a variety of different locations in a variety of different ways that are known in the art.

Referring back to FIGS. 1 and 2, the attachment portion 114 of the speaker carrier 110 defines a speaker mount 244 that coupled to the speaker 112 and a receiving surface 240 that is configured to receive a mating surface of the electronics module 120. A mating groove 242 defined by the receiving surface 240 of the attachment portion 114 is configured to detachably couple to the mating surface (not visible from this view) of the electronics module 120. The mating groove 242 additionally can define electrical contacts that are configured to contact mating electrical contacts exposed on the mating surface of the electronics module 120. The speaker carrier 110 additionally has a microphone 116 disposed on a microphone boom 118. In the embodiment shown in the drawings, the microphone 116 is positioned in an intermediate portion of the microphone boom 118. In another embodiment the microphone is disposed on the distal end of the microphone boom 118, where the distal end of the boom is the end furthest away from the headset. The boom 118 can be constructed of a variety of materials including metal, plastics, and so on. In one embodiment the boom 118 is constructed of aluminum. In some embodiments the boom is pivotable relative to the speaker.

In at least one embodiment the microphone 116 is an array of two or more microphones. Such microphones can be configured to exclude certain audio signals, such as audio signals that are received by the microphone at a particular angle, for example. In those embodiments, a processor can be used in conjunction with the microphones to achieve a noise-cancelling affect. In another embodiment the microphone 116 is a single microphone. Those having skill in the art will appreciate the variety of types of microphones that can be used consistently with the technology disclosed herein.

In some embodiments, the electronics module is configured to attach to and detach from the speaker carrier without the use of tools, utilizing a mechanical snap-fit connection. In some embodiments, a latch release is provided on the electronics module or the speaker carrier to be used to release the parts from engagement. In some embodiments, a simple tool like a screwdriver or a small wrench is used to detach and attach the electronics module and the speaker carrier.

It will be appreciated that speaker carriers consistent with the technology disclosed herein can have a variety of configurations depending on the needs of the system users. As such, speaker carriers consistent with the technology disclosed herein can be applicable to a variety of different industries. In some embodiments, the speaker carrier has a microphone, but in other embodiments the speaker carrier does not have a microphone. In the embodiment of FIGS. 1 and 2, the speaker carrier 110 has a single speaker 112, but in a variety of embodiments, the speaker carrier has two speakers. The speaker carrier can further have status lights and a circuit board, where the circuit board can have a microcontroller and, in at least one embodiment, an authentication protocol (SHA-1 protocol, etc.) that either queries the electronics module for an authentication response or provides an authentication response to the electronics module. The speaker carrier can also have a user input device to, for example, modify user settings such as volume, operating channel, and the like.

Referring again to FIGS. 1 and 2, the communication device 100 also has the electronics module 120. The electronics module 120 generally has the circuitry required to drive devices of the speaker carrier 110. The electronics module 120 also defines a user input device 124 that is configured to receive commands from a user such as, for example, changing the volume or operating channel of the wireless transceiver. The electronics module 120 is configured to electrically communicate with a battery 122 to provide power to the device 100. In the embodiment of FIGS. 1 and 2, the electronics module 120 has a housing 126 that is configured to slidably receive the battery 122. A contact point 128 on the battery transmits electric potential to the electronics module 120. The housing 126 is configured to attach and detach easily from the speaker carrier 110.

With regard to the circuitry of the electronics module 120, although not visible in the current embodiment, the electronics module 120 has at least a wireless transceiver in communication with the speaker and the microphone of the speaker carrier when the speaker carrier is attached to the electronics module. Other components of the speaker carrier that can be driven by the electronics module include status lights such as LEDs and the authentication protocol. In some embodiments the electronics module has status lights in addition to or instead of the speaker carrier, in which case the electronics module would have status lights and driving electronic circuitry. Contrary to FIGS. 1 and 2, in some embodiments the electronics module has a microphone instead of the speaker carrier.

With regard to the authentication protocol mentioned above, the electronics device can include an authentication protocol with an authentication challenge or response algorithm. The authentication function can ensure that system components are manufactured to reliably function together.

Additional circuitry in the electronics module can include multimedia playback memory, such as audio recording memory and/or video recording memory, and a computer-readable data storage interface, such as a Universal Serial Bus (USB). The wireless transceiver is a radio frequency transceiver in one embodiment. Examples of radio communication protocols that can be used include a wireless local area network using IEEE 802.11 standards, Bluetooth, Zig-Bee, and Digital Enhanced Cordless Telecommunications (DECT) and Worldwide Digital Cordless Telecommunications (WDCT). In another embodiment the wireless transceiver is consistent with other forms of wireless transmission and combinations of forms of wireless transmission. The electronics module is generally detachably coupled to the speaker carrier such that the speaker driver and the speaker are also detachably coupled. The speaker carrier and the electronics module are detachably coupled so that the electronics module provides audio signals to the speaker when the speaker carrier and electronics module are coupled.

Figure 3:
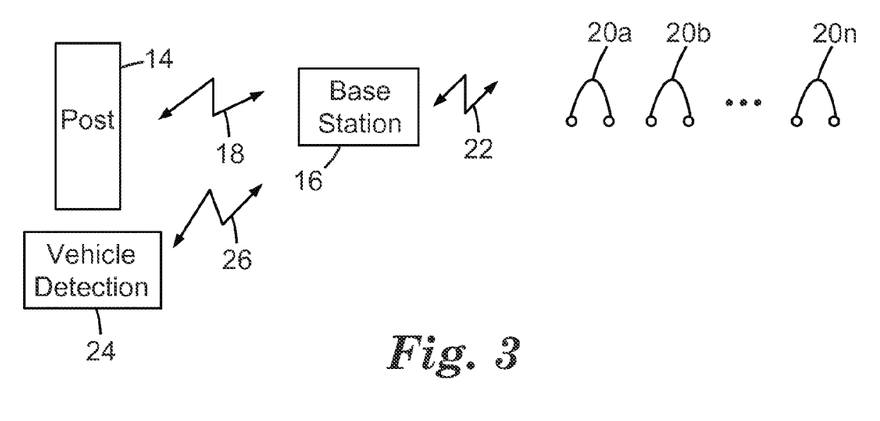
FIG. 3 is a schematic of an example implementation of a communication system consistent with the technology disclosed herein.

FIG. 3 is a schematic of an example implementation of a communication system consistent with the technology disclosed herein. The example implementation is consistent with an ordering communication system for a quick service restaurant. An establishment has order placing equipment 14, typically a communication post associated with or near a menu board, placed near a drive-through ordering lane which customers may approach in their vehicles and verbally order directly from their vehicle using the order placing equipment 14.

The order placing equipment 14 is coupled in communication with base station 16 typically located in the establishment using a first communication link 18. The first communication link 18 can be hard-wired or can be a wireless communication link. The base station 16 communicates wirelessly with a plurality of modular communication devices 20*a*, 20*b* . . . 20*n* on a second communication link 22. As such, the base station 16 generally has a wireless transceiver. Modular communication devices 20*a*, 20*b* . . . 20*n* are generally attached in proximity to employees of the establishment. As shown in the figure, the modular communication devices 20*a*-20*n* can be headsets worn by employees or, as described above, the modular communication devices can each be attached proximate to, or directly on, each respective employee in a variety of different ways, as will be appreciated by those having skill in the art.

It will be appreciated by those having skill in the art that a second drive-through ordering lane having second order placing equipment can be included in systems consistent with FIG. 3. In such systems the second order placing equipment including a communication post is also in communication with the base station 16 on a different frequency that the first order placing equipment. In such embodiments each employee associated with a modular communication device can have the option of choosing the order placing equipment with which the modular communication device will be in communication with. Each modular communication device can have a user input device that selects the particular order placing equipment to be in communication with.

A vehicle detection device 24 can be at or near the order placing equipment 14 that is configured to detect the arrival of a vehicle in proximity to the order placing equipment 14 and communicate the detection notification to one or more employees. In the current implementation, the vehicle detection device 24 is in communication with the base station 16, which transmits the detection notification to the one or more modular communication devices 20*a*, 20*b*, . . . 20*n*. In one embodiment the one or more modular communication devices 20*a*, 20*b*, . . . 20*n* provide vehicle detection notifications through an audio signal. In another embodiment the one or more modular communication devices 20*a*, 20*b*, . . . 20*n* provide vehicle detection notifications through illumination of a status light. Those having skill in the art will appreciate the variety of particular configurations of a vehicle detection device 24.

One or more of the employees associated with a modular communication device can communicate with a customer through the order placing equipment 14 or monitor communication between the order placing equipment 14 and other employees. At least one of the employees may communicate with a customer in the drive-through facility using order placing equipment 14 to obtain an order from the customer. A portion of the employees can be wearing, and communicating through, one of modular communication devices 20*a*, 20*b*, . . . 20*n*, and other employees can wear the remaining ones of headsets 20*a*, 20*b*, . . . 20*n*, primarily to listen, or monitor communication between the customer and employee taking the order. Thus, a communication link using the first communication link 18 and the second communication link 22 connects personnel of the establishment with a customer located at order placing equipment 14.

A number of electronics modules of the communication devices 20*a*-20*n* can have different configurations to give varying functionality to each respective speaker carrier depending on needs of the users and the system. The speaker carrier can be removed from and attached to the electronic module so as to interchange electronic modules as desired. For example, a first electronics module of a first communication device 20*a* can have a microphone for a first device user to communicate with the ordering post, and a second electronics module of a second communication device 20*b* can omit a microphone when the second device user need only monitor the communication between the first device user and the ordering post. A third device user can wear a third communication device 20*h* having a third electronics module with a microphone through which the third device user can communicate with at least the first device user. In such a system, the first through third electronic modules can be interchangeable across speaker carriers. In another example system configuration, each of the communication devices in the system has a microphone so each device user can communicate with the rest of the device users or the order placing equipment 14.

In one embodiment, an electronics module excludes a radio transceiver and, instead, receives pre-recorded media content. The pre-recorded media content can be relevant to education or training, in one example, dictation, in another example, and commercial content, in yet another example. In such embodiments content could be loaded to the electronics module through a computer-readable data storage device. In some embodiments the electronics module is configured to play particular content based on the proximity of the electronics module to a particular object. This configuration could be particularly useful for training applications. The electronics pod in this particular embodiment can include RFID technology such that when the headset is in range of a particular object, audio content is automatically presented to the user.

Figure 4:
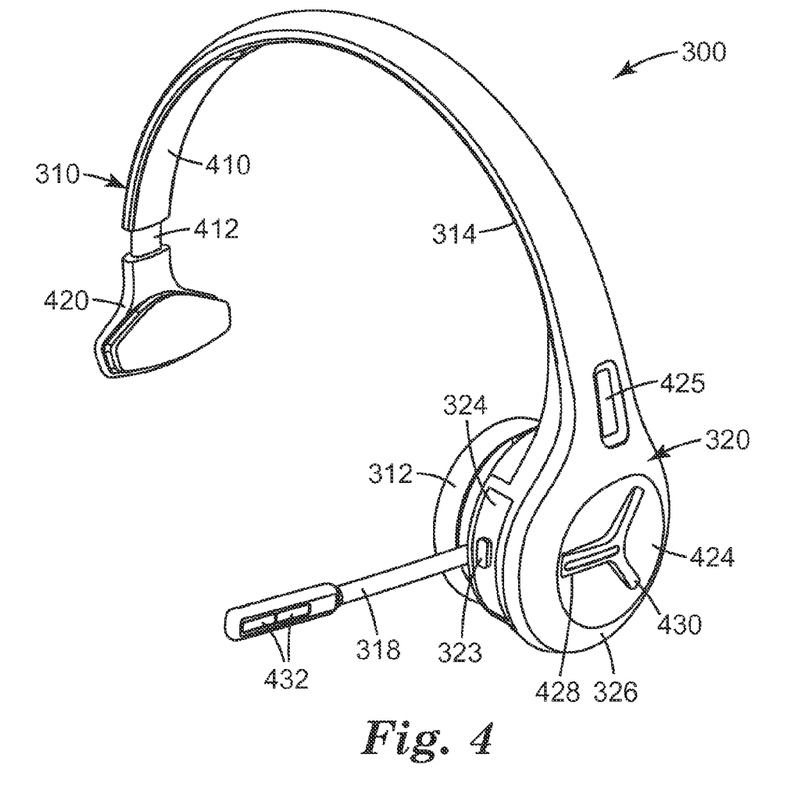
FIG. 4 is another embodiment of a modular communication device, consistent with the technology disclosed herein.
Figure 5:
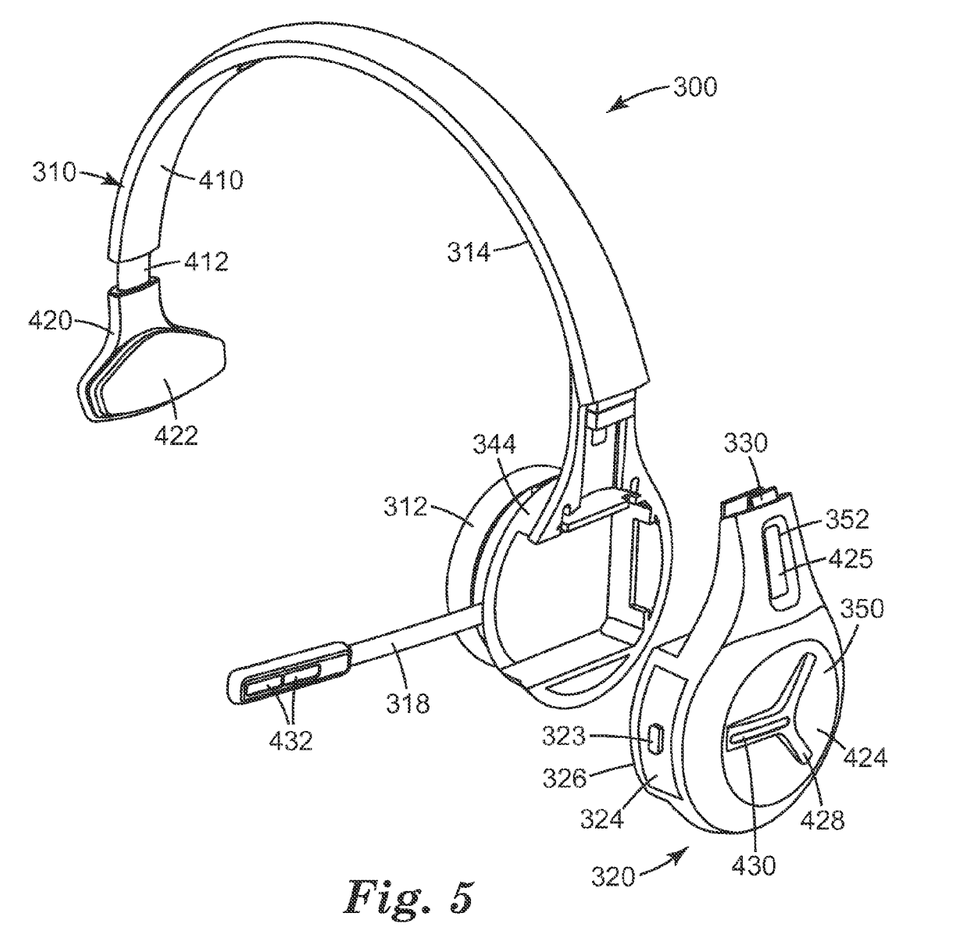
FIG. 5 depicts a partially-exploded view of the embodiment depicted in FIG. 4.
Figure 6:
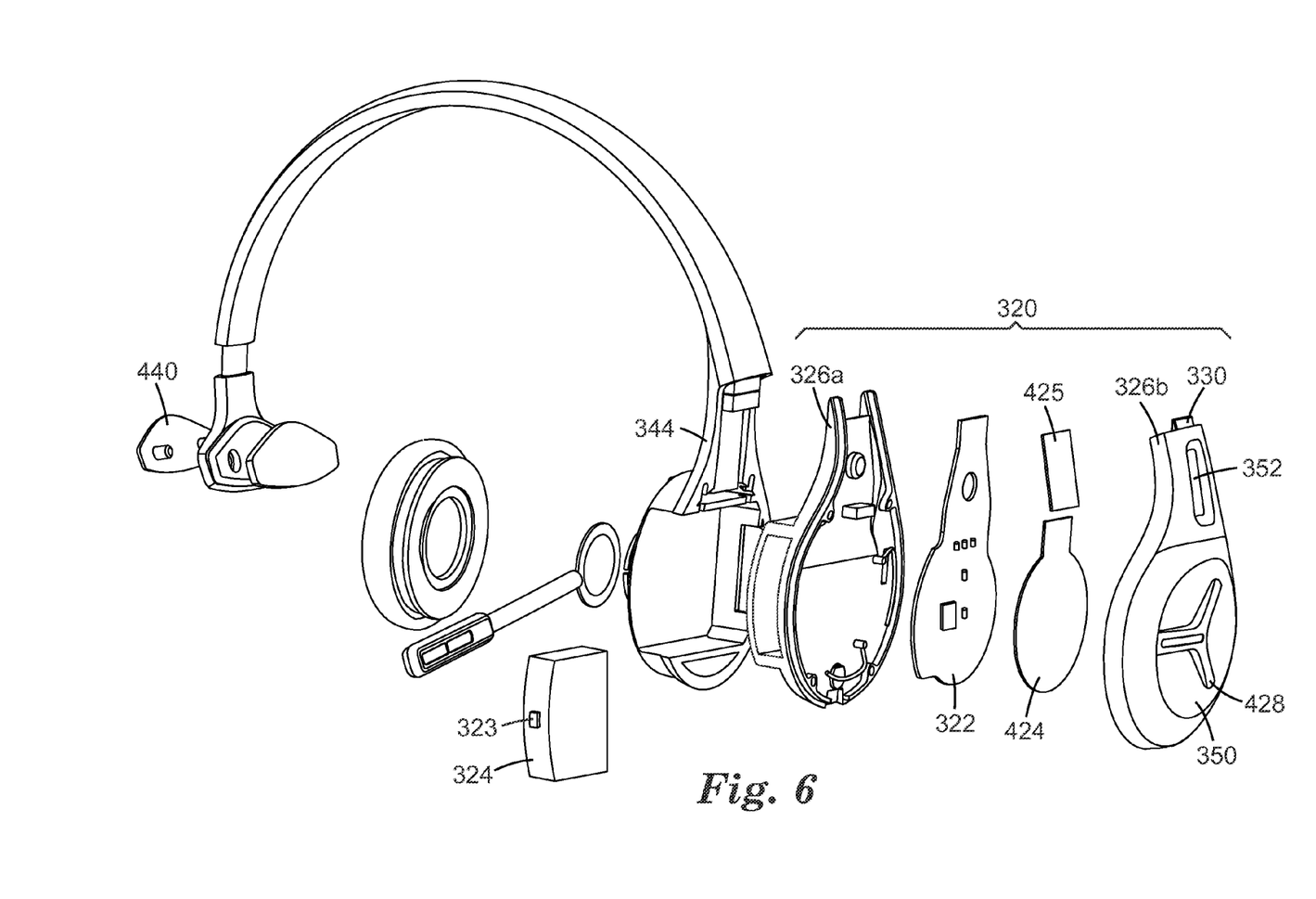
FIG. 6 depicts an exploded view of the embodiment depicted in FIG. 4.

FIGS. 4-6 depict another embodiment of a modular communication device consistent with the technology disclosed herein. A speaker carrier 310 has a speaker 312, a microphone 316, and an attachment portion 314, where the attachment portion 314 is a headset. An electronics module 320 is detachably coupled to the speaker carrier 310, and the electronics module 320 has driving circuitry 322, a first user input device 424 a second user input device 425, and one or more status lights 430.

A battery 324 is received at least by the electronics module 320 and is in electrical communication with the electronics module 320. In other embodiments, the battery is received by the speaker carrier 310 or is received between the speaker carrier 310 and the electronics module 320.

In some embodiments, the battery 324 has a user input device 323 that can be used to check the battery status. After depressing or otherwise activating the user input device 323, an indicator of the battery level is displayed. In one embodiment, the status of the battery is displayed by a light bar on the divider element 428 on the housing 326 of the electronics module 320. In another embodiment, the user input device to check battery status is on a different part of the electronics module 320 such as not located on the battery 324.

As mentioned above, the attachment portion 314 in the embodiment of FIGS. 4-6 is configured as a headset. The attachment portion 314 has a head strap, which can be made from plastic, metal, from a metal band within a plastic housing, or any other material known in the art, and which defines an inner annular surface 410 of the attachment portion 314 that is configured to be received by the head of a device user. A protective slider 420 slidably couples to one end of the head strap and has a head cushion 422 to accommodate a device user. An identification element 440 (shown only on FIG. 6) can be disposed on the outer surface of the protective slider 420 to identify the particular modular communication device 300. A speaker mount 344 is coupled to the opposite end of the attachment portion 314 that is configured to hold the speaker 312. The speaker 312 has an ear cushion disposed thereon, in a variety of embodiments, which is the most easily visible in FIGS. 4-6. The speaker component itself is centered within the speaker cushion and contained within the speaker mount 344.

The microphone (not visible from this view) is disposed along the boom 318, and the boom 318 is received by the speaker mount 344. A boom enclosure 317 is disposed towards the distal end of the boom 318 which houses one or more status lights 432. The boom enclosure 317 can be constructed of a variety of materials known in the art such as polycarbonate, as one example. The status lights 432 can be one or more light emitting diodes (LEDs) in a variety of embodiments. The speaker 312, microphone and status lights 432 are in electrical communication with the electronics module 320.

The communication device can be configured so that one of the status lights 432 is illuminated in response to a vehicle being detected by a vehicle detection device located in proximity to the order placing equipment. In one embodiment, when a vehicle is first detected, the status light 432 illuminates briefly to indicate that a vehicle has arrived and has not yet been greeted. After the vehicle has been greeted by an employee using a communication device, the status light 432 changes to a solid color. After the vehicle has left the order post, which occurs after the order has been communicated to an employee, the status light 432 is no longer illuminated.

The electronics module 320 is detachably coupled to the speaker carrier 310. In some embodiments, the electronics module 320 is detachable from the speaker carrier 310 and attachable to the speaker carrier without the use of tools, utilizing one or more mechanical snap-fit connections. In one embodiment of a snap fit connection, the housing component 326 of the electronics module 320 includes a tab 330 which is received by a corresponding cavity in the speaker carrier 310. The top part of the housing 326 is angled toward the speaker carrier 310 while the tab 330 is inserted into the cavity of the speaker carrier 310. Then the rest of the housing 326 is pressed against the speaker carrier 310 and mating structures cooperate to snap into place to hold the electronics module 320 onto the speaker carrier 310. A release latch is provided on either the housing 326 or the speaker carrier 310 to release the snap-fit connection.

Now referring to the exploded view of FIG. 6, a circuit board 322 is disposed in the electronics module housing 326, between an inner housing component 326a and an outer housing component 326b. The first and second user input devices 424, 425 are in electrical communication with the circuit board 322. The inner housing component 326a and the outer housing component 326b mutually engage to contain the circuit board 322 and retain contact between the user input device(s) 424, 425 and the circuit board 322.

The outer housing component 326b defines a first access opening 350 through which the first user input device 424 can be accessed by the device user. In the embodiment of FIGS. 4-6, the first user input device 424 is a touch-surface through which a user can change the operating channel of the transceiver. In a variety of embodiments, the first user input device 424 is in communication with one or more capacitive switches. As such, the first user input device 424 can be recessed to prevent unintended contact with the user input device 424 during normal handling. In one example depicted in FIGS. 4-6, the first access opening 350 is divided into three spaces by a divider element 428. In one embodiment, one of the spaces is a user input device to change the operating channel to be a radio frequency used for a first drive-through lane of the restaurant. One of the spaces is a user input device to change the operating channel to a radio frequency used for a second drive-through lane of a restaurant. The third space is a user input device to page other users of the communication system. In other embodiments, one of the user input devices is for powering the communications device 300 on or off and for other control aspects.

The outer housing component 326b defines a second access opening 352 through which the second user input device 425 can be accessed by the device user. The second user input device 425 is a touch-surface similar to the first user input device 424. As such, the second user input device 425 can have one or more capacitive switches in communication therewith. In one embodiment, the second user input device 425 can be used by a user to change the speaker volume. For example, a top half of the touch surface exposed within the first access opening 350 can be a volume up adjustment while the other half is a volume down adjustment. Another status light 430 can be disposed within the divider element 428 and be in electrical contact with the circuit board and configured to be visible to third parties, in some embodiments. The electronics module 320 is further configured to receive a battery 324 and retain the battery 324 in a battery compartment and in electrical communication with the circuit board 322. In one embodiment, the inner housing component 326a of the electronics module 320 is configured to receive the battery 32. In another embodiment, the outer housing component 326b is configured to receive the battery 324.

Figure 7:
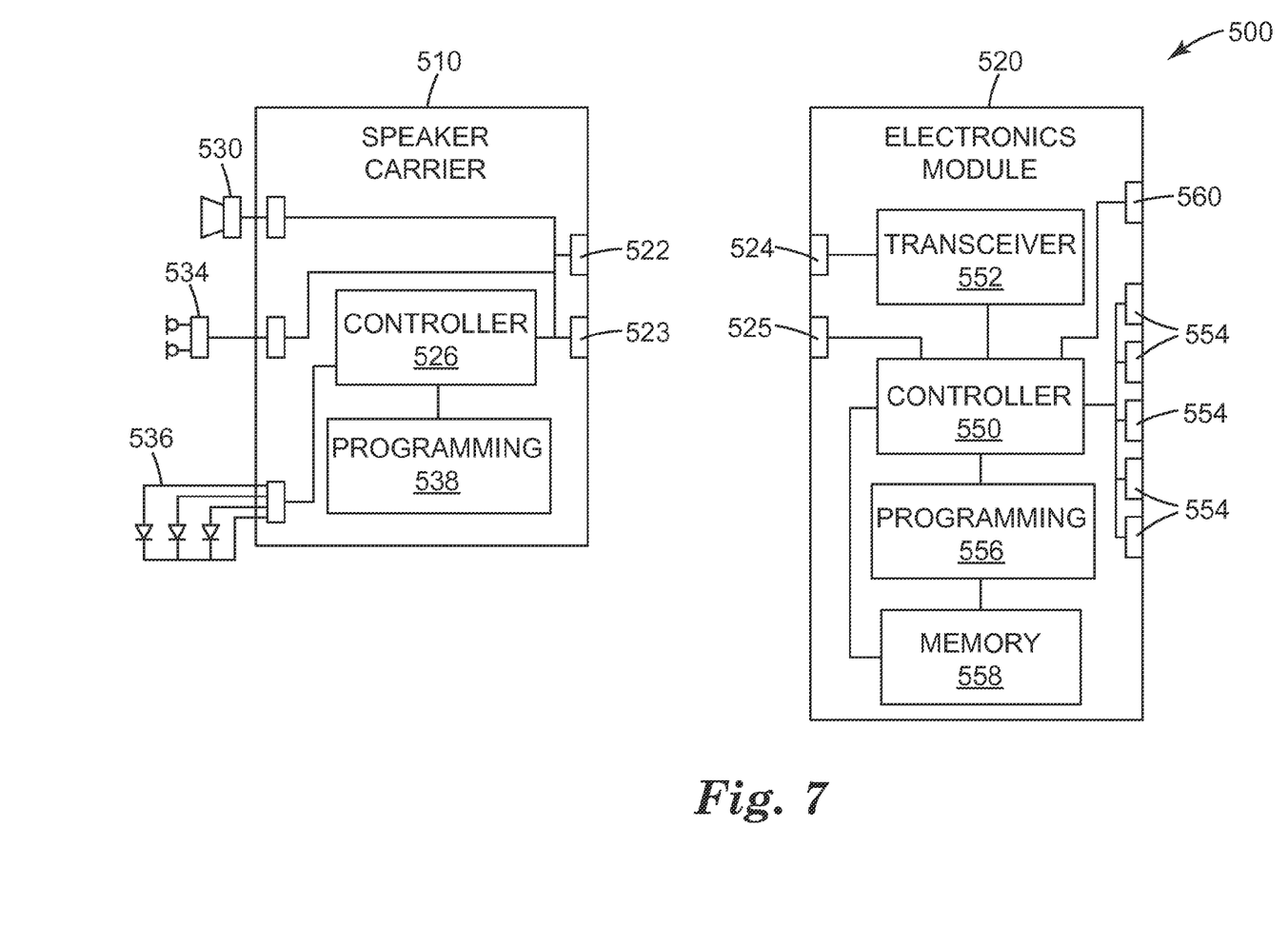
FIG. 7 depicts a schematic of example circuitry consistent with the technology disclosed herein.

FIG. 7 depicts a schematic of one example of circuitry for an example modular communication device 500. The speaker carrier 510 is attachable to and detachable from an electronics module 520. The speaker carrier 510 includes connection devices 522, 523 that mate with connection devices 524, 525 on the electronics module 520. In one embodiment, the connection devices 522, 523,524, 525 connect electrically and mechanically to establish electrical communication between the components of the electronics module and the components of the speaker carrier 510. Electrical contacts are one example of a connection device. In a variety of embodiments, one of the speaker carrier 510 connection devices 522 is configured to transmit analog signals and the other of the speaker carrier 510 connection devices 523 is configured to transmit digital signals. Correspondingly, each of the electronics module 520 connection devices 524, 525 is configured to operatively couple to one of the speaker carrier 510 connection devices 522, 523, respectively.

The speaker carrier 510 has a speaker 530 and a microphone 534, each electrically coupled to one or more of the connection devices 522, 523. In some embodiments, the microphone 534 is a pair of dual matched microphones. In some embodiments, the device 500 does not include a microphone, and in some embodiments there are two speakers provided for positioning one near each of the user's ears. The speaker carrier 510 also has a controller 526 that is in communication with one or more indicator lights 536 and a programming module 538. The controller 526 is generally the driver for the indicator lights 536 and can include an inter-integrated circuit ($I^2C$). The programming module 538 may include an authentication protocol for ensuring that the speaker carrier 510 only operates when it is connected to the correct electronics module 520. The authentication protocol can be, for example, an algorithmic inquiry that requires a particular response algorithm from the electronics module 520. In one embodiment, the electronics module 520 is programmed to power off if a speaker carrier is attached that is not algorithmically compatible with the authentication protocol. The controller 526 is also in communication with the connection devices 522, 523 and can receive signals from the electronics module 520 via the connection devices 522, 523.

The electronics module 520 includes a transceiver 552 which is capable of wireless communication with a base station, for example, to transmit audio signals to the speaker 530 of the speaker carrier 510 via the connection devices 522 and/or 524. In one embodiment, the transceiver 552 receives wireless communication by radio frequency communication. Multiple channels may be obtained using multiple frequencies, time-division multiple access (TDMA), code-division multiple access (CDMA) or other commonly known and available technologies. The transceiver 552 is configured to communicate with a base station as discussed above in relation to FIG. 3. The transceiver 552 and the controller 550 act as a speaker driver to provide audio signals to the speaker 530 of the speaker carrier 510.

The transceiver 552 can be configured to receive other data, as well. For example, in the context of a quick service restaurant, notification that a vehicle has been detected at an ordering post can be received by the transceiver 552 and an appropriate notification can then be sent to the device user. In one embodiment such notification can be audio through the speaker. In another embodiment such notification can be tactile through vibrations, which will be discussed below. In yet another embodiment such notification can be visual through illumination of one or more status lights 536 that are in communication with the transceiver 552. Those having skill in the art will appreciate that the transceiver 552 can be a single transceiver compatible with multiple types of data or can be one or more transceivers that are each compatible with one or more types of data.

In one embodiment, the modular communication device 500 does not include an audio transceiver and is instead used to provide playback of audio content, voice recording or both functions to a user. Playback of audio content using a modular communication device 500 can be particularly useful in the context of training and education or for entertainment purposes. For example, the device 500 could play specific educational or training content depending on the proximity of the user to a certain object or piece of equipment. In another embodiment, the content of the playback could be determined based on user input. In an embodiment without a transceiver, the memory 558 and a controller 550 act as a speaker driver to provide audio signals to the speaker 530 of the speaker carrier 510.

The electronics module 520 also includes a controller 550 which is in communication with the digital connection device 525 and to one or more user input devices 554 which can be configured to control various aspects of the communication device such as transmission channel or volume. In a variety of embodiments, one or more sub-processors are in communication with the user input devices 554 that are configured to send activation data to the controller, such as the location of the activation. In one embodiment, the system provides an audio signal to the user through the speaker 530 whenever one of the user input devices 554 are activated, such as a low audio tone when the volume is adjusted or another user input device 554 is used. In another embodiment, the system provides tactile feedback to the user when a user input device is activated, such as through vibration. In such an embodiment an actuator is incorporated in the system that is in communication with the controller 550. An actuator can also be configured to provide tactile feedback upon receipt of user notifications, such as vehicle detection at an ordering post in a quick service restaurant, as discussed above.

The controller 550 is also in communication with a programming module 556. The programming module 556 can include an authentication protocol for ensuring that the electronics module 520 only operates when it is connected to a compatible correct speaker carrier 510. In an embodiment distinguishable from the authentication configuration discussed with reference to the speaker carrier 510, the programming module 556 is configured to provide an authentication inquiry that requires a particular response algorithm from the speaker carrier 510. In such an embodiment the speaker carrier programming module 538 is configured to provide a particular response algorithm to the electronics module 520. Other authentication configurations are also contemplated. Also, the programming module 556 of the electronics module 520 can include an authentication protocol for a battery, as well.

The controller 550 may also be in communication with a memory component 558. The memory component 558 can store audio files, for example, to enable voice recording and content for playback. Audio content can be loaded to the memory component 558 using a data interface 560, such as a USB connection or cable connection.

In one embodiment the electronics module can include an accelerometer to sense when the modular communication device 500 is in use. In such embodiments the accelerometer can be in communication with the electronics module 520 controller 550 to automatically turn the device on and off when particular conditions are met. For example, the modular communication device 500 can be turned on automatically when the device is moved, for example.

It will be appreciated by those having skill in the art that the various functionality incorporated in the electronics module can be incorporated into one or more integrated circuits.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as "arranged", "arranged and configured", "constructed and arranged", "constructed", "manufactured and arranged", and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

This application is intended to cover adaptations or variations of the present subject matter. It is to be understood that the above description is intended to be illustrative, and not restrictive.

We claim:

1. A communication system comprising:
   a modular communication device, the modular communication device comprising:
      a carrier comprising:
         a speaker;
         a microphone;
         a microcontroller; and
         an attachment portion, the attachment portion comprising a first plurality of electrical contacts; and
      an electronics module comprising:
         a wireless transceiver;
         a microcontroller; and
         an attachment portion comprising a second plurality of electrical contacts;
      wherein the carrier and the electronics module are adapted to be mechanically and electrically detachably coupled at the attachment portion of the carrier and the attachment portion of the electronics module;
      wherein the electronics module and the carrier are adapted such that:
         at least two of the first plurality of electrical contacts are coupled with at least two of the second plurality of electrical contacts such that the electronics module is in electronic communication with the carrier;
         the electronics module is physically supported by the carrier;
         the microcontroller of the electronics module is adapted to communicate with the microcontroller of the carrier over the first and second plurality of electrical contacts to authenticate the carrier using a challenge and response authentication protocol including the use of a cryptographic function; and
         the wireless transceiver of the electronics module is adapted to:
            wirelessly receive audio signals from a wireless intercom base station and provide the audio signals to the carrier to be played by the speaker; and
            wirelessly transmit audio signals received by the microphone to the
         wireless intercom base station using a wireless signal;
      wherein, when the carrier and the electronics module are not mechanically and electrically coupled, the audio signals are not passed between the carrier and the electronics module;
      wherein the detachably coupled carrier and electronic module are designed for module interconnectivity; and
      wherein the electronics module comprises a user input device for changing a wireless channel of the wireless transceiver.

2. The communication system of claim 1, wherein the carrier further comprises a boom with the microphone disposed thereon.

3. The communication system of claim 1, wherein the carrier further comprises one or more status lights.

4. The communication system of claim 3, wherein one of the one or more status lights is in communication with the wireless transceiver and is configured to illuminate when the wireless transceiver receives a vehicle detection notification.

5. The communication system of claim 1, wherein the microcontroller of the carrier is disposed on a circuit board.

6. A wireless inter headset comprising:
   a carrier comprising:
      a speaker;
      a microphone; and
      an attachment portion, the attachment portion comprising a first plurality of electrical contacts;
   an electronics module comprising:
      a wireless transceiver; and
      a housing comprising a tab and a second plurality of electrical contacts;
   wherein the carrier and the electronics module are adapted to be mechanically and electrically detachably coupled, the tab of the housing received by a corresponding cavity in the carrier, the carrier and the electronics module adapted to couple with each other by first angling the housing toward the carrier while the tab is inserted into the cavity of the carrier and then pressing a face of the housing against the carrier such that mating structures snap into place to hold the electronics module onto the carrier;
   the electronics module and the carrier are adapted such that:
      at least two of the first plurality of electrical contacts are coupled with at least two of the second plurality of electrical contacts such that the electronics module is in electronic communication with the carrier;
      the electronics module is physically supported by the carrier;
      the wireless transceiver of the electronics module is adapted to wirelessly receive audio signals from a wireless intercom base station and provide the audio signals to the carrier to be played by the speaker; and the wireless transceiver also adapted to transmit audio signals received by the microphone to the wireless intercom base station using a wireless signal;

wherein, when the carrier and the electronics module are not mechanically and electrically coupled, no audio signals are passed between the carrier and the electronics module;

wherein the carrier can be removed from and attached to the electronic module; and wherein the electronics module comprises a user input device for changing a wireless channel of the wireless transceiver.

7. The wireless intercom headset of claim 6, wherein the electronics module further comprises a status light.

8. The wireless intercom headset of claim 6, wherein the electronics module further comprises an authentication protocol.

9. The wireless intercom headset of claim 6, wherein the electronics module further comprises multimedia playback memory.

10. The wireless intercom headset of claim 6, wherein the electronics module further comprises a USB interface.

11. The wireless intercom headset of claim 6, wherein the electronics module further comprises audio recording memory and video recording memory.

12. The wireless intercom headset of claim 6, further comprising an actuator configured to provide tactile feedback to a device user upon receipt of a vehicle detection notification.

13. A wireless intercom headset comprising:
a carrier comprising:
  a speaker;
  a microphone;
  a microcontroller; and
  an attachment portion, the attachment portion comprising a first plurality of electrical contacts;
an electronics module comprising:
  a wireless transceiver;
  a microcontroller; and
  an attachment portion comprising a tab and a second plurality of electrical contacts;
  wherein the carrier and the electronics module are adapted to be mechanically and electrically detachably coupled, the tab of the attachment portion received by a corresponding cavity in the carrier, the carrier and the electronics module adapted to couple with each other by first angling a housing of the electronics module toward the carrier while the tab is inserted into the cavity of the carrier and then pressing a face of the housing against the carrier such that mating structures snap into place to hold the electronics module onto the carrier;

the electronics module and the carrier are adapted such that:
  at least two of the first plurality of electrical contacts are coupled with at least two of the second plurality of electrical contacts such that the electronics module is in electronic communication with the carrier; and
  the electronics module is physically supported by the carrier;
  the microcontroller of the electronics module is adapted to communicate with the microcontroller of the carrier over the first and second plurality of electrical contacts to authenticate the carrier; and
  the wireless transceiver of the electronics module is adapted to:
    wirelessly receive audio signals from a wireless intercom base station and provide the audio signals to the carrier to be played by the speaker; and
    wirelessly transmit audio signals received by the microphone to the wireless intercom base station using a wireless signal;

wherein, when the carrier and the electronics module are not mechanically and electrically coupled, the audio signals are not passed between the carrier and the electronics module;

wherein the detachably coupled carrier and electronic module are designed for modular interconnectivity; and wherein the electronics module comprises a user input device for changing a wireless channel of the wireless transceiver.

14. The electronics module of claim 13, further comprising a capacitive switch in communication with the microcontroller of the electronics module; and
a user input device in communication with the capacitive switch.

15. The communication system of claim 1, comprising an intercom base station and a second modular communication device, a second carrier of the second modular communication device adapted to both attach to the electronics module of the carrier of the modular communication device and a second electronics module of the second modular communication device.

16. The communication system of claim 8, wherein the electronics module of the modular communication device is adapted to both attach to the carrier of the modular communication device and the second carrier of the second modular communication device.

17. The communication system of claim 8, wherein the audio signals transmitted by the modular communication device are received by the intercom base station and transmitted to the second modular communication device.

18. The wireless intercom headset of claim 13, wherein the housing comprises a battery compartment for receiving a battery.

* * * * *

UNITED STATES PATENT AND TRADEMARK OFFICE
CERTIFICATE OF CORRECTION

PATENT NO. : 9,641,926 B2
APPLICATION NO. : 13/910448
DATED : May 2, 2017
INVENTOR(S) : Steven Awiszus et al.

Page 1 of 1

It is certified that error appears in the above-identified patent and that said Letters Patent is hereby corrected as shown below:

In the Claims

Column 12
Line 38, Claim 6, delete "inter" and insert -- intercom --, therefor.

Column 14
Line 43, Claim 16, delete "communication system" and insert -- wireless intercom headset --, therefor.
Line 48, Claim 17, delete "communication system" and insert -- wireless intercom headset --, therefor.

Signed and Sealed this
Fifth Day of February, 2019

Andrei Iancu
*Director of the United States Patent and Trademark Office*